United States Patent [19]
Simpson

[11] Patent Number: 5,991,973
[45] Date of Patent: Nov. 30, 1999

[54] AIR YARD BLOWER

[76] Inventor: Timothy A. Simpson, 1574 Sugar Maple Way, West Bloomfield, Mich. 48324

[21] Appl. No.: 08/911,828

[22] Filed: Aug. 15, 1997

[51] Int. Cl.[6] .................................................... A47L 5/14
[52] U.S. Cl. ................................ 15/402; 15/344; 15/405
[58] Field of Search ............................. 15/405, 402, 401

[56] References Cited

U.S. PATENT DOCUMENTS

| | | |
|---|---|---|
| D. 375,822 | 11/1996 | Lessig, III et al. . |
| 2,586,145 | 5/1952 | Breuer et al. . |
| 2,598,499 | 5/1952 | Breuer et al. .......................... 15/405 X |
| 2,899,063 | 8/1959 | Ellis ....................................... 15/402 X |
| 3,384,921 | 5/1968 | Loston .................................... 15/402 |
| 3,999,243 | 12/1976 | La Pour . |
| 4,884,314 | 12/1989 | Miner et al. ............................ 15/405 X |
| 5,054,159 | 10/1991 | Richardson ............................ 15/398 X |
| 5,063,635 | 11/1991 | Ishii et al. . |
| 5,440,782 | 8/1995 | Yamashita . |
| 5,497,532 | 3/1996 | Glatz . |
| 5,768,748 | 6/1998 | Silvera et al. ........................... 15/402 |
| 5,774,933 | 7/1998 | Jannicelli ................................ 15/405 X |

*Primary Examiner*—Chris K. Moore

[57] ABSTRACT

A yard blower is provided which includes a housing mounting a source of high volume pressurized air, a hose fluidly communicating with the housing for directing the pressurized air, a nozzle with a rear end connected with the hose for distributing the pressurized air. The nozzle has a front end with an opening for releasing the pressurized air. The nozzle also has a generally rigid rake formed by a plurality of spaced apart tines projecting from the nozzle allowing the nozzle to agitate yard debris.

20 Claims, 3 Drawing Sheets

AIR YARD BLOWER

BACKGROUND OF THE INVENTION

This invention relates in general to high volume pressurized air blowers utilized in lawn maintenance; specifically, to an air yard blower and a nozzle for such a blower.

It is well know in the art of lawn maintenance to use high volume pressurized air yard blowers to blow away grass clippings, shrubbery clippings, or yard debris. Another major use of air yard blowers is for gathering tree leaves.

In most conditions, an air yard blower can be used to gather leaves easily by moving them with high pressure air. Particularly initially fallen leaves that are supported above the ground on underlying blades of grass. These leaves are easily lifted by the air exiting an air yard blower nozzle. However, under some conditions, air yard blowers suffer deficiencies in gathering leaves. An air yard blower's deficiency is partly due to the absence of a mechanical means to free leaves that become entangled between blades of grass.

While large leaves are generally supported by underlying blades of grass, small or thin leaves settle between blades of grass. Even the stems of large leaves sometimes become entangled between blades of grass making removal with an air yard blower difficult. When the stem of a large leaf is entangled between blades of grass, the operator of an air yard blower may attempt to free the leaf by increasing the blower's air flow. Increasing the air flow sometimes causes the leaf to be pressed against the ground or to just spin about its entangled stem. In such situations the leaves are incapable of being swept away by the air yard blower.

Another example of an air yard blow's deficiency is apparent when use to gather leaves that have piled on top of each other. These leaves become heavy and have a tendency to stick together and stick to the grass. This tendency to stick increases when there is moisture present from rain or dew and is further increased when moisture freezes. Often when sticking occurs the air stream from a blower will be incapable of moving leaves.

The use of air yard blowers and nozzles found in prior art also experience deficiencies when used to remove fallen leaves from ground covering; such as, rocks, barks, vegetation or flowering plants. Since many ground coverings are vegetation that have large leaves, it is easy for fallen leaves to become caught between them. Furthermore, shrubbery leaves are generally smaller than leaves from trees and often settle on ground covering during trimming. To sweep debris from rock or bark type ground covering, the air flow rate must be carefully adjusted so as not to blow them from a defined area. These are some of the reasons the present invention, which integrates a mechanical means with a typical air yard blower nozzle to assist in the gathering of leaves, is brought forth.

A Sears CRAFTSMAN® gasoline powered blower Model No. 358.797931 discloses an air yard blower with a blower tube. The blower tube has a nozzle with an integrated straight edge. The straight edge is integral to the bottom front edge of the nozzle and is approximately three inches long and one-eight inches thick. The straight edge projects one-quarter of an inch downward. Although, the purpose of this edge is not described in the owner's operations manual this nozzle suffers many disadvantages over the present invention. The edge is too wide and blunt to effectively spread apart blades of grass. The edge does not extend far enough from the bottom of the nozzle to reach the root area of the grass. Even if the edge was made to extend further it would not be capable of pulling leaves, grass clipping or debris from the grass. The use of a flat straight edge to agitate ground covering also suffer disadvantages over the present invention in that it would shove rather than agitate the ground covering much like a hoe rather than a rake.

SUMMARY OF THE INVENTION

To overcome the deficiencies and problems associated with air bowers heretofore known, the present invention is brought forth. The present invention in a preferred embodiment provides an air yard blower which uses a compressor to generate an adjustably high volume of pressurized air. Connected to the compressor housing is a tube or hose for directing the pressurized air. A nozzle is provided having a rear end connected to the hose. The nozzle has a front end with an opening from which the pressurized air expands upon exiting. Projecting downward from the front lower edge of the nozzle is a rake with a plurality of somewhat stiff tine members. In an alternate preferred embodiment of the present invention the rake is removably attached to a bottom edge of a blower nozzle. The forks are preferably sufficiently wide to spread apart blades of grass and ground covering; such as, rock, bark and vegetation. The nozzle of the present invention combines a rake with the air sweeping function of an air yard blower to gather leaves, grass clippings, shrubbery clippings and other yard debris. Advantages of the present invention over nozzles heretofore known are described hereinafter. The tine members of the rake, attached to the bottom edge of an air nozzle, can be used to pull entangled leaves, sticks and other yard debris from the root area or from between blades of grass where they can be swept away by the pressurized air stream of an air yard blower. The rake tines are used to spread apart blades of grass where leaves and grass clippings sometimes settle. Rake tines are used to loosen or agitate material thereby increasing the sweeping efficiency of an air nozzle. The rake tines are sufficiently long but are not too long whereas they might impede a user's motion during the use of an air yard blower. Because small or thin leaves settle between blades of grass a higher air flow rate is generally required to sweep them from the lawn. However, the use of rake tines reduces the need to increase the blower's air flow rate to remove smaller leaves; thus conserving energy. The rake tines of the present invention is used to gently agitate blades of grass positioning small leaves and grass clippings to where they can be easily swept away by the air stream. Another advantage of having rake tines on a blower nozzle's bottom edge is to break up clumps of grass clippings or to agitate leaves that have become stuck together.

The air nozzle of the present invention can also be used to agitate ground covering while blowing away leaves and other debris. The rake tines allow ground covering areas to be swept using a relatively low air flow rate of sufficient pressure to sweep away the debris without blowing away the ground covering. A lower air flow also reduces the amount of airborne dirt particles that can be hazardous if ingested or caught in an eye. Yet another advantage of the present invention is obvious when the invention is used to remove leaves or debris that lie on the ground adjacent to a wall, fence or from the corner of a structure. In such situations, the leaves or debris can be pulled away from the obstruction and blown clear.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
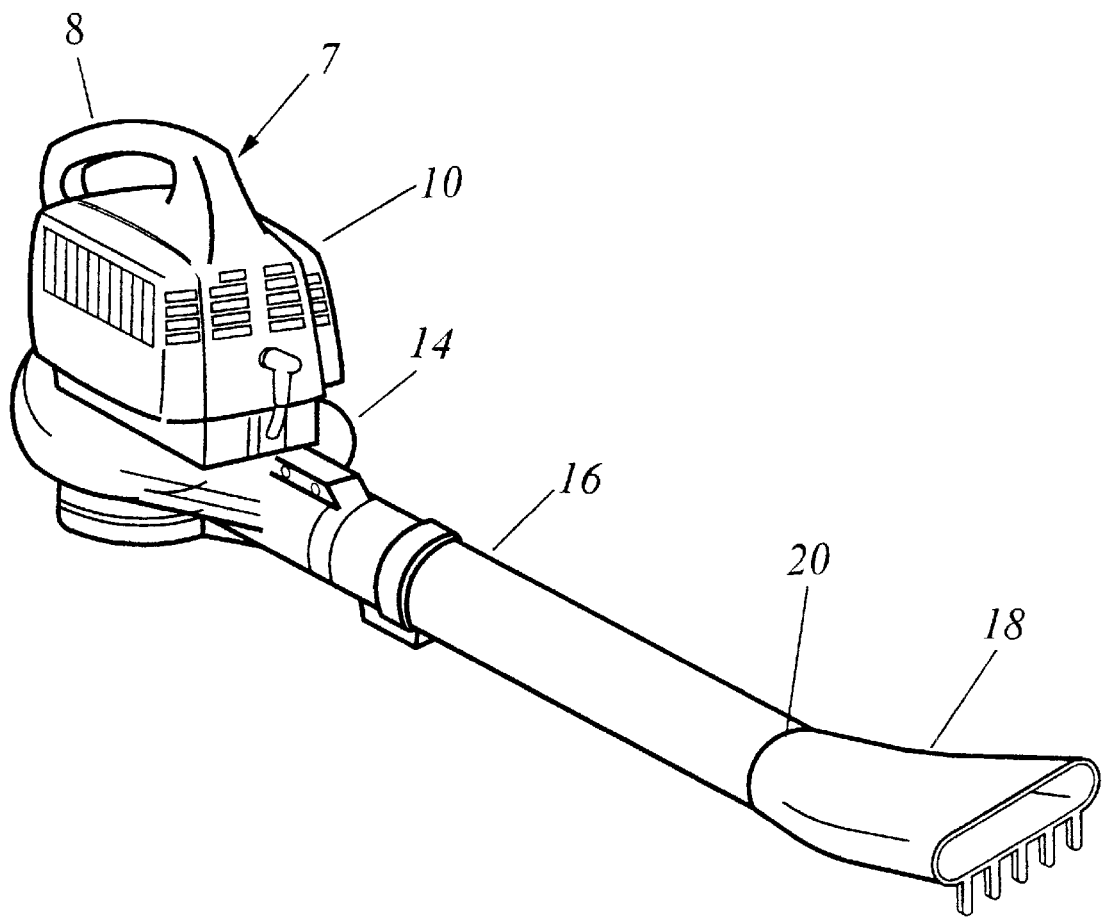
FIG. 1 is a perspective view of a preferred embodiment air yard blower according to the present invention.
Figure 2:
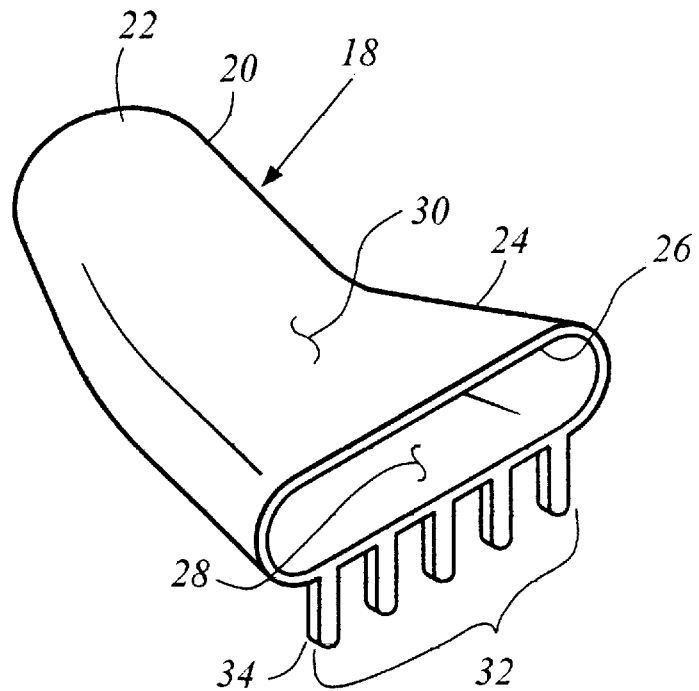
FIG. 2 is a perspective view of a nozzle utilized in the air yard blower shown in FIG. 1.

Referring to FIGS. 1 and 2, a high volume air yard blower 7 according to the present invention has a housing 10. The housing 10 typically mounts a two cycle gasoline engine or an electric motor. The engine or motor powers a compressor or blower mechanism 14 that provides a source of pressurized air. Typical air flow rate values are usually over 100 cubic ft. per min. with a common rating being 360 cubic ft. per min. For example, a typical 360 cubic ft. per min. flow rate air yard blower is powered by a 32 cubic cm. two cycle engine. The above noted air yard blower has an air speed of approximately 170 miles per hr. Air yard blowers with even higher flow rates are commercially available. A generally rigid hose 16 is connected with and fluidly communicating with the housing 10. The hose 16 directs the output of pressurized air from the blower 14.

Integrally or removably connected to the hose 16 is a nozzle 18 (FIG. 2). The nozzle 18 has a convergent rear end 20. The rear end 20 has an opening 22 for receipt of pressurized air from the blower 14. In most instances the nozzle 18 will have a nearly flat floor 28 and a top 30. A front divergent end 24 of the nozzle fluidly communicates with the rear end 20. The front end 24 has a semi-rectangular opening 26. The front end 24 and opening 26 are typically sized to release the pressurized air in a transversely diffusive manner to better facilitate the movement of yard debris.

Projecting generally vertically downward from the front end 24 is a rake 32. The rake 32 is formed from a plurality of spaced apart generally rigid tines 34. The tines 34 may be formed integral with the nozzle 18 or may be fabricated of metal in an individual or comb like fashion and embedded into a moldable polymeric nozzle housing. In operations where the pressurized air is not effective in moving leaves or yard debris, the rake 32 is used to agitate the yard debris by pulling, spiking or otherwise contacting the yard debris.

Figure 3:
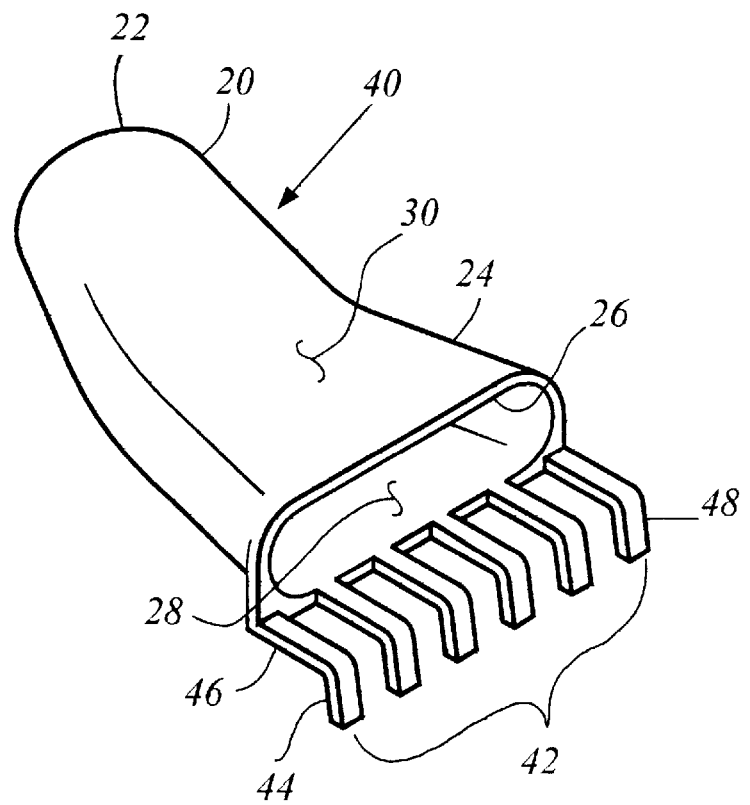
FIG. 3 is a perspective view of an alternate preferred embodiment nozzle for the air yard blower show in FIG. 1.

Referring to FIG. 3 still another alternate preferred embodiment nozzle 40 is shown. The nozzle 40 is substantially similar to the nozzle 18 with the exception of the rake 42. The rake 42 has a plurality of generally horizontally and then vertically downward extending tines 44. The rake 42 is more visible to the operator while still being able to pull underlying vegetation. Additionally a horizontal section 46 of the tines act as a cantilever spring to urge a vertical section 48 downward when the nozzle is being used in a raking action.

Figure 4:
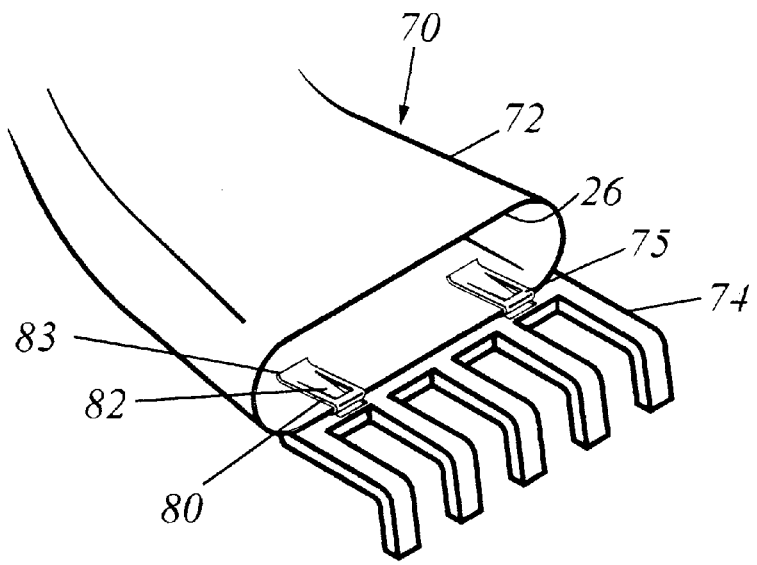
FIG. 4 is a perspective view of another alternate preferred embodiment nozzle for the air yard blower show in FIG. 1.
Figure 5:
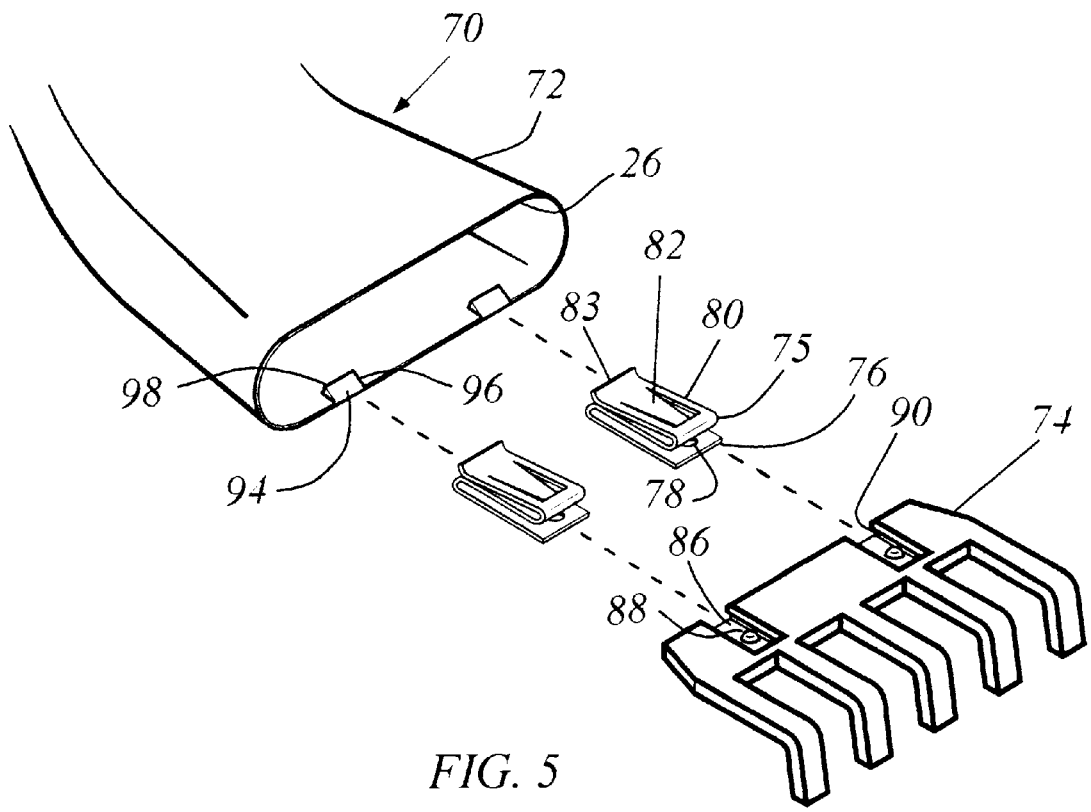
FIG. 5 is an exploded view of the nozzle show in FIG. 4.

FIGS. 4 & 5 illustrate another alternate preferred embodiment of the present invention. The embodiment 70 has a divergent nozzle 72. The nozzle 72 is substantially similar to the aforementioned nozzles 18 and 40 and similar items will be given like reference numerals. The nozzle 72 has a removable rake 74. Removal of the rake 74 can be desired to allow the nozzle to be inserted into a gutter or other tight location. Removal of the rake 74 can also be desired to allow for replacement of a worn rake 74 without requiring a new nozzle 72.

The rake 74 is held to the nozzle 72 by two clips 75. The clip 75 is formed in a generally S shape (shown in a backward direction in FIGS. 4 & 5). A lower leg 76 of the clip 75 has an upward formed dimple or cut out 78. An upper leg 80 of the clip 75 has a punched out descending tab 82.

The rake 74 has a slot 86 with a button or mound 88. The slot has two generally parallel overhangs 90. Near the opening 26 of the nozzle are two ramps 94. Each ramp 94 has an inclined front edge 96 and a rear stop edge 98.

To join the rake 74 to the nozzle 72, the lower legs 76 of the clip are pushed into the slots 86. The overhangs 90 vertically trap the lower legs 76 of the clips 75 into the slots 86. After the clips 75 are pushed forward, the lower legs 76 will snap over the mounds 88. When the dimples 78 snap over the mounds 88, the clips 75 are then joined with the rake 74.

With the clips 75 snapped into position, the rake 74 is pushed toward the nozzle 72. The clips 75 have a bend 83 to help the clips 75 ride up the front edges 96. The tabs 82 of the clips 75 will ride up the ramp front edges 96. When a front edge of the tabs 82 is pushed beyond the ramp front edges 96, the tabs 82 will drop behind the rear stop edges 98 and the clip 75 will be locked to the nozzle 72.

In another assembly method, the clips 75 are first joined with the nozzle 72 and the rake 74 is pushed backward. In still another operation the nozzle 72 and rake 74 are aligned with one another. The clips 75 are placed in between the nozzle 72 and the rake 74. The clips 75 are aligned with the slots 86 and the ramps 94. The nozzle 72 and the rake 74 are then simply urged toward one another and each clip snaps into connection with both the nozzle 72 and the rake 74.

Referring back to FIGS. 1 & 3, in operation the tines 44 of the rake 42 attached to the floor 28 of the nozzle 22 can be moved by manipulating the yard air blower handle 8. The tines 44 pull entangled leaves, sticks and other yard debris from the root area or from between blades of grass where they can be swept away by the pressurized air stream of an air yard blower 7. The rake tines 44 are also used to spread apart blades of grass where leaves and grass clippings sometimes settle or to loosen or agitate material thereby increasing the sweeping efficiency of a nozzle 18. The rake tines 44 are sufficiently long but are not too long whereas they might impede an operator's motion during the use of an air yard blower 7.

The principal and mode of operation of this invention have been explained and illustrated in its preferred embodiments. However it must be understood that this invention may be practiced otherwise than as specifically explained and illustrated without departing from its scope.

What is claimed is:

1. A nozzle for an air yard blower comprising:
    a rear end for connection with a high volume source of pressurized air, said rear end having a rear opening for receipt of pressurized air;
    a front end fluidly communicating with said rear end, said front end having a front opening whereby said front opening is generally vertical having a top edge and a bottom edge for releasing said pressurized air in a transversely divergent manner; and
    a generally rigid rake formed by a plurality of spaced apart tines whereby said tines are generally coplanar to said front opening of said nozzle, said tines are adjacent to said bottom edge and project downwardly from said bottom edge allowing said nozzle to agitate yard debris.

2. A nozzle as described in claim 1 wherein said tines are integral with said nozzle.

3. A nozzle as described in claim 1 wherein said rake is removable.

4. A nozzle as described in claim 1 wherein said rake is held to said nozzle by a clip.

5. A nozzle as described in claim 4 wherein there are a plurality of clips.

6. A nozzle as described in claim 4 wherein said clip is metallic.

7. A nozzle as described in claim 4 wherein said clip has a snap connection with said nozzle.

8. A nozzle as described in claim 7 wherein said nozzle has a ramp with front and rear edges and said clip has a tab that is stopped by said ramp rear edge.

9. A nozzle as described in claim 8 wherein said clip has a bend for riding up said nozzle ramp front edge.

10. A nozzle as described in claim 4 wherein said clip has a snap connection with said rake.

11. A nozzle as described in claim 4 wherein said clip has a generally S shape.

12. An air yard blower comprising:

a housing mounting a high volume source of pressurized air;

a hose fluidly communicating with said housing for directing said pressurized air;

a nozzle connected with said hose for distributing said pressurized air, said nozzle including;

a rear end having an opening for connection with said hose;

a front end fluidly communicating with said rear end, said front end having an opening for releasing said pressurized air in a divergent manner, and said front end opening having a bottom edge;

a generally rigid rake formed by a plurality of spaced apart tines projecting from said front end bottom edge allowing said nozzle to agitate yard debris.

13. A air yard blower as described in claim 12 wherein said nozzle rake forks project generally horizontally outward and then generally vertically downward.

14. A nozzle for an air yard blower comprising:

a rear end for connection with a high volume source of pressurized air, said rear end having an opening for receipt of pressurized air;

a front end fluidly communicating with said rear end, said front end having an opening for releasing said pressurized air; and a generally rigid rake formed by a plurality of spaced apart tines whereby said tines project generally horizontally outward and then generally vertically downward from said nozzle front end allowing said nozzle to agitate yard debris.

15. A nozzle for an air yard blower comprising:

a rear end for connection with a high volume source of pressurized air, said rear end having an opening for receipt of pressurized air;

a front end fluidly communicating with said rear end, said front end having an opening for releasing said pressurized air; and a generally rigid rake formed by a plurality of spaced apart tines projecting from said nozzle front end allowing said nozzle to agitate yard debris, said rake being held by a clip, and said clip has a snap connection with said rake.

16. A nozzle as described in claim 15 wherein said clip has a snap connection with said nozzle.

17. A nozzle as described in claim 15 wherein said rake has a slot with a mound and said clip is captured within said slot.

18. A nozzle as described in claim 17 wherein said rake slot has an overhang.

19. A nozzle for an air yard blower comprising:

a rear end for connection with a high volume source of pressurized air, said rear end having an opening for receipt of pressurized air;

a front end fluidly communicating with said rear end, said front end having an opening for releasing said pressurized air; and a generally rigid rake formed by a plurality of spaced apart tines projecting from said nozzle front end allowing said nozzle to agitate yard debris and wherein said rake is held to said nozzle by a clip, said clip having a generally S shape.

20. A nozzle as described in claim 19 wherein said clip is metallic.

\* \* \* \* \*